United States Patent
Jang et al.

(10) Patent No.: US 9,984,264 B2
(45) Date of Patent: May 29, 2018

(54) DATA TRANSMISSION APPARATUS, DATA READ APPARATUS, DATA ENCODING AND DECODING APPARATUS, AND METHOD THEREOF FOR PATTERNIZED DATA

(71) Applicant: Industrial Technology Research Institute, Hsinchu (TW)

(72) Inventors: Lih-Guong Jang, Hsinchu (TW); Yu-Jung Chang, New Taipei (TW); Yi-Yuan Chen, Taoyuan (TW); Wen-Kuei Lai, Kaohsiung (TW); Nien-Chu Wu, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days. days.

(21) Appl. No.: 14/973,734

(22) Filed: Dec. 18, 2015

(65) Prior Publication Data

US 2017/0124368 A1 May 4, 2017

(30) Foreign Application Priority Data

Oct. 29, 2015 (TW) .............................. 104135546 A

(51) Int. Cl.
*G06K 19/06* (2006.01)
*G06K 7/10* (2006.01)
(Continued)

(52) U.S. Cl.
CPC ....... *G06K 7/10722* (2013.01); *G06K 7/1413* (2013.01); *G06K 7/1417* (2013.01);
(Continued)

(58) Field of Classification Search
CPC ....... G06K 19/06112; G06K 19/07705; G06K 19/07707; G06K 19/06037
See application file for complete search history.

(56) References Cited

U.S. PATENT DOCUMENTS 6,606,396 B1 * 8/2003 Ishibashi .................. G06K 7/14
283/72
8,494,218 B2 7/2013 Chen et al.
(Continued)

FOREIGN PATENT DOCUMENTS

CN 12101079140 11/2007
CN 1601911 4/2010
(Continued)

OTHER PUBLICATIONS

Zhang et al, "SBVLC: Secure barcode-based visible light communication for smartphones", INFOCOM, 2014 Proceedings IEEE, Apr. 27-May 2, 2014, pp. 2661-2669.
(Continued)

*Primary Examiner* — Suezu Ellis
(74) *Attorney, Agent, or Firm* — JCIPRNET

(57) ABSTRACT

A data encoding and decoding system including an encoding apparatus and a decoding apparatus is provided. The encoding apparatus is configured to patternize a data. The encoding apparatus displays the patternized data in a manner of dynamic twinkling. The patternized data twinkles in a predetermined frequency. The decoding apparatus is coupled to the encoding apparatus. The decoding apparatus is configured to capture the data which dynamically twinkles in a predetermined time period. The decoding apparatus performs a data processing operation on the captured data to identify the captured data. In addition, a data encoding and decoding method is also provided.

48 Claims, 6 Drawing Sheets

(51) Int. Cl.
    *G06K 7/14*     (2006.01)
    *H04B 10/00*     (2013.01)

(52) U.S. Cl.
    CPC .. *G06K 19/06037* (2013.01); *G06K 19/06112* (2013.01); *H04B 10/00* (2013.01)

(56) References Cited

U.S. PATENT DOCUMENTS

| | | | |
|---|---|---|---|
| 8,587,680 B2 | 11/2013 | Okumura et al. | |
| 8,813,154 B1* | 8/2014 | Sivertsen | H04N 21/812 235/462.07 |
| 8,851,392 B2* | 10/2014 | Shinotani | G06K 7/1095 235/494 |
| 8,965,117 B1* | 2/2015 | Rybakov | G06K 9/18 382/162 |
| 2006/0098241 A1 | 5/2006 | Cheong et al. | |
| 2010/0030592 A1* | 2/2010 | Evans | G06K 7/1095 705/5 |
| 2010/0131368 A1* | 5/2010 | Morris | G06K 7/14 705/14.65 |
| 2010/0172651 A1* | 7/2010 | Nien | H04B 10/1141 398/135 |
| 2010/0238198 A1* | 9/2010 | Ideguchi | G06K 7/1093 345/666 |
| 2010/0272193 A1* | 10/2010 | Khan | H04L 1/0041 375/259 |
| 2011/0007171 A1 | 1/2011 | Okumura et al. | |
| 2012/0211567 A1* | 8/2012 | Herzig | G06K 19/06065 235/488 |
| 2013/0256395 A1* | 10/2013 | Barkan | G06Q 20/00 235/375 |
| 2013/0313314 A1 | 11/2013 | Jeng et al. | |
| 2014/0117100 A1* | 5/2014 | Black | G07F 19/20 235/494 |
| 2016/0078336 A1* | 3/2016 | Ari | G06K 19/06103 235/494 |
| 2016/0132708 A1* | 5/2016 | Tsou | G06Q 30/02 235/462.1 |

FOREIGN PATENT DOCUMENTS

| | | |
|---|---|---|
| CN | 201681412 | 12/2010 |
| CN | 101995240 | 3/2011 |
| CN | 102842081 | 12/2012 |
| CN | 13103034944 | 4/2013 |
| CN | 103490812 | 1/2014 |
| CN | 103532880 | 1/2014 |
| CN | 103871027 | 6/2014 |
| CN | 104346596 | 2/2015 |
| CN | 104348761 | 2/2015 |
| TW | I271668 | 1/2007 |
| TW | 201027936 | 7/2010 |
| TW | I335546 | 1/2011 |
| TW | 201137757 | 11/2011 |
| TW | 201239660 | 10/2012 |
| TW | 201314599 | 4/2013 |
| TW | 201316951 | 5/2013 |
| TW | I416922 | 11/2013 |
| TW | I437509 | 5/2014 |
| TW | I460662 | 11/2014 |

OTHER PUBLICATIONS

Chen-Chien Lin, "A General Scheme for QR-code Image Denoising on the Camera Phone", Master Thesis of Graduate of Communication Engineering, College of Electrical Engineering and Computer Science, National Taiwan University, Jan. 2009, pp. 1-44.

Pok et al., "Selective Removal of Impulse Noise Based on Homogeneity Level Information", IEEE Transactions on Image Processing, Jan. 2003, pp. 85-92.

"Office Action of Taiwan Counterpart Application," dated Apr. 20, 2017, p. 1-p. 19, in which the listed references were cited.

* cited by examiner

DATA TRANSMISSION APPARATUS, DATA READ APPARATUS, DATA ENCODING AND DECODING APPARATUS, AND METHOD THEREOF FOR PATTERNIZED DATA

CROSS-REFERENCE TO RELATED APPLICATION

This application claims the priority benefit of Taiwan application no. 104135546, filed on Oct. 29, 2015. The entirety of the above-mentioned patent application is hereby incorporated by reference herein and made a part of this specification.

TECHNICAL FIELD

The disclosure relates to a data transmission apparatus and a method thereof, a data reading apparatus and a method thereof, and a data encoding and decoding system and a method thereof.

BACKGROUND

In recent years, with popularities of portable electronic apparatuses and the Internet, developments in data exchange have been rapidly transformed from traditional paper form into electronic form. The most common data exchange formats are presented by, for example, bar code, QR (quick response) code and color code. Carriers of bar code, QR code and color code have been transferred from original paper prints to the portable electronic apparatuses. A method of applying the above is to display a data content to be exchanged on a screen of the portable electronic apparatus, so that the data content may be scanned and interpreted by a data reading apparatus. As such, bar code, QR code and color code can be found almost everywhere in our daily life. Because said data exchange manner is advantageous in high convenience, easy traceability, high efficiency ratio, anti-wear capability and high read rates, together with the popularity of the portable electronic apparatuses, said data exchange manner can be widely used in various application since messages may be transferred to consumers or uploaded to a remote system simply by utilizing a camera function of the portable electronic apparatus. Further, when information is obtained by reading bar code, QR code and color code in order to simplify a manual inputting procedure or provide a data transmission, not only is frequency of a paper operating process reduced to achieve the environmental objectives, interactions in the human machine interface may also become more convenient.

Although the aforementioned data exchange manner can provide users with convenience in various ways such as easy storage and management, an image capturing device of the data reading apparatus can be easily influenced by various screen specifications currently used by the portable electronic apparatuses in the market. Accordingly, when capturing images, property and degree of influences to the image capturing unit caused by noise interference may vary, resulting in issue of low success rate for the scanning and thereby influencing fluency for operating entire service system. In addition, a data security issue may also arise when using the aforementioned data exchange manner.

SUMMARY

A data transmission apparatus of the disclosure includes an encoding apparatus. The encoding apparatus is configured to patternize a data. The encoding apparatus displays the patternized data in a manner of dynamic twinkling to transmit the patternized data. The patternized data twinkles in a predetermined frequency.

A data transmission method of the disclosure includes: patternizing a data; and displaying the patternized data in a manner of dynamic twinkling to transmit the patternized data. The patternized data twinkles in a predetermined frequency.

A data reading apparatus of the disclosure includes a decoding apparatus. The decoding apparatus is configured to capture a data which is patternized and dynamically twinkles in a predetermined time period. The decoding apparatus performs a data processing operation on the captured data to identify the captured data. The patternized data twinkles in a predetermined frequency.

A data reading method of the disclosure includes: capturing a data which is patternized and dynamically twinkles in a predetermined time period; and performing a data processing operation on the captured data to identify the captured data. The patternized data twinkles in a predetermined frequency.

A data encoding and decoding system of the disclosure includes an encoding apparatus and a decoding apparatus. The encoding apparatus is configured to patternize a data. The encoding apparatus displays the patternized data in a manner of dynamic twinkling. The patternized data twinkles in a predetermined frequency. The decoding apparatus is coupled to the encoding apparatus. The decoding apparatus is configured to capture the data which dynamically twinkles in a predetermined time period. The decoding apparatus performs a data processing operation on the captured data to identify the captured data.

A data encoding and decoding method of the disclosure includes: patternizing a data; displaying the patternized data in a manner of dynamic twinkling; capturing the data which dynamically twinkles in a predetermined time period; and performing a data processing operation on the captured data to identify the captured data. The patternized data twinkles in a predetermined frequency.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
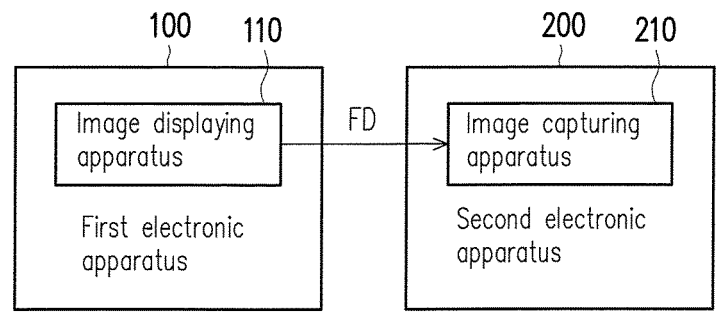
FIG. 1 is a schematic block diagram illustrating a data transmission and reading system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments are provided below to describe the disclosure in detail, though the disclosure is not limited to the provided embodiments, and the provided embodiments can be suitably combined. The term "coupling/coupled" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

The disclosure is directed to a data transmission apparatus and a method thereof, a data reading apparatus and a method thereof, and a data encoding and decoding system and a method thereof, which are capable of improving security in data transmission while improving correctness and convenience in data reading.

Based on the above, according to the exemplary embodiments of the disclosure, in the data transmission apparatus and the method thereof, the data reading apparatus and the method thereof, and the data encoding and decoding system and the method thereof, the patternized data is displayed in the manner of dynamic twinkling, and the patternized data twinkles in the predetermined frequency. As a result, the security in data transmission may be improved while improving the correctness and convenience in data reading.

FIG. 1 is a schematic block diagram illustrating a data transmission and reading system according to an embodiment of the disclosure. Referring to FIG. 1, a data transmission and reading system 300 of the embodiment includes a first electronic apparatus 100 and a second electronic apparatus 200. The first electronic apparatus 100 includes an image displaying apparatus 110. The first electronic apparatus 100 is, for example, an electronic apparatus with image displaying functions and data encoding functions, and a data transmission method thereof includes (but not limited to) transmitting an encoded data FD by displaying image frames. The second electronic apparatus 200 includes an image capturing apparatus 210. The second electronic apparatus 200 is, for example, an electronic apparatus with image capturing functions and data decoding functions, and a data reading method thereof includes (but not limited to) reading the decrypted and decoded data FD by capturing the image frames displayed by the first electronic apparatus 100 in a predetermined time period.

In the embodiment, the image frames displayed by the first electronic apparatus 100 include the data FD which is patternized and dynamically twinkles. The data FD twinkles in a predetermined frequency, and may be designed as dynamically twinkling image frames which are visible or invisible to users, and not particularly limited by the disclosure. In the embodiment, the first electronic apparatus 100 served as a data transmission apparatus may be, for example, a portable electronic apparatus capable of operating independently, such as a smart phone, a non-smart phone, a wearable electronic apparatus, a tablet computer, a personal digital assistant (PDA) or a notebook computer, but the disclosure is not limited to the above. In the embodiment, the second electronic apparatus 200 served as a data reading apparatus may be, for example, an electronic apparatus with system control functions, such as a smart home server, a smart robot, a central control system, a cloud server control center and a desktop computer, but the disclosure is not limited to the above. In addition, the second electronic apparatus 200 may also be the portable electronic apparatus capable of operating independently, such as the smart phone, the non-smart phone, the wearable electronic apparatus, the tablet computer, the personal digital assistant or the notebook computer.

In an application embodiment, the first electronic apparatus 100 may be, for example, the portable electronic apparatus, whereas the second electronic apparatus 200 may be, for example, the electronic apparatus with the system control functions, such as a point of sale terminal (POS terminal), which may be a fixed host system. The two electronic apparatuses may perform mobile ticket and payment operations, such as payment functions of an electronic wallet. In another application embodiment, the first electronic apparatus 100 and the second electronic apparatus 200 may both be the portable electronic apparatus, and the second electronic apparatus 200 is served as a host system at sale end to perform the mobile ticket and payment operations with the first electronic apparatus 100. The operations of the mobile ticket and payment are performed by the users in a handheld manner. Accordingly, the first electronic apparatus 100 can use the patternized data FD as a foreground image in a specific twinkling frequency, and embed the patternized data FD into a background image to serve as a visualized mobile ticket. After capturing the image frames by the image capturing apparatus 210, the second electronic apparatus 200 can perform an image processing analysis and a decoding process to interpret the image frames for the data content. The first electronic apparatus 100 can embed multiple-information by variations in time, space and patterns, so that the second electronic apparatus 200 can read the corresponding data FD by using different decoding parameters.

In the embodiment, the first electronic apparatus 100 and the second electronic apparatus 200 may further include functional elements including, for example, operation modules, storage modules, communication modules, power modules and so on, which are not particularly limited by the disclosure.

Figure 2:
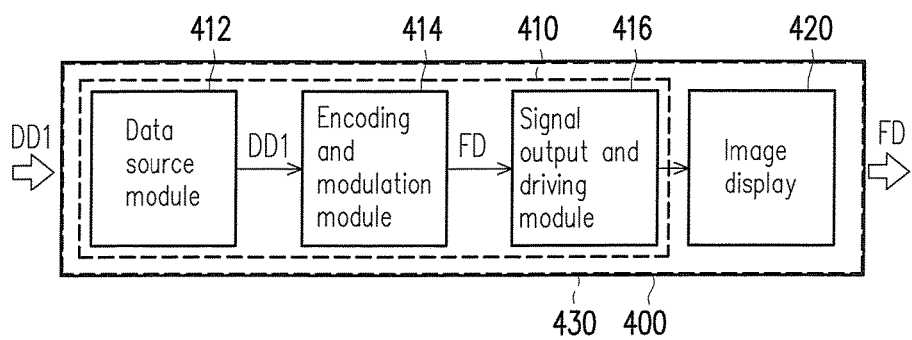
FIG. 2 is a schematic block diagram illustrating a data transmission apparatus according to an embodiment of the disclosure.
Figure 3:
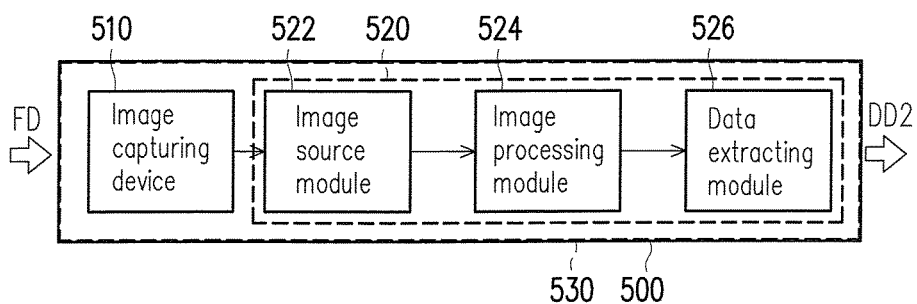
FIG. 3 is a schematic block diagram illustrating a data reading apparatus according to an embodiment of the disclosure.

FIG. 2 is a schematic block diagram illustrating a data transmission apparatus according to an embodiment of the disclosure. FIG. 3 is a schematic block diagram illustrating a data reading apparatus according to an embodiment of the disclosure. Referring to FIG. 2 and FIG. 3, a data transmission apparatus 400 of the embodiment with encoding functions includes an encoding apparatus 430, which is configured to patternize a data DD1 and display the patternized data FD in a manner of dynamic twinkling to transmit the patternized data FD to a data reading apparatus 500. The data reading apparatus 500 of the embodiment with decoding functions includes a decoding apparatus 530, configured to capture the data FD which is patternized and dynamically twinkles in a predetermined time period and perform a data processing operation on the captured data FD to identify the captured data FD, so as to generate and output an identified data DD2. In the embodiment, the patternized data FD twinkles in a predetermined frequency.

In the embodiment, the encoding apparatus 430 includes an encoding block 410 and an image display 420. The encoding block 410 includes a data source module 412, an encoding and modulation module 414 and a signal output and driving module 416. In application scenarios related to the mobile ticket and payment, the data DD1 includes, for example, ticket issue or electronic wallet information. The data source module 412 is used as a data transmission interface, which receives and temporarily stores the data DD1 in order to output the data DD1 to the encoding and modulation module 414. Next, the encoding and modulation module 414 patternizes the data DD1 in order to encrypt the data DD1. In the embodiment, in the same image frame, the encoding and modulation module 414 patternizes the data DD1 into the same identification pattern. In different image frames, the encoding and modulation module 414 patternizes the data DD1 into different types of identification patterns, so as to improve the security of data after encoding. Next, the encoding and modulation module 414 performs a digital signal modulation operation on the patternized data FD, such that when the signal output and driving module 416 drives the image display 420 according to the patternized data FD, the image display 420 may display the patternized data FD in the manner of dynamic twinkling. In the embodiment, the digital signal modulation operation includes, for example, amplitude-shift keying (ASK) (i.e., on-off keying modulation (OOK modulation)). In an embodiment, the encoding and modulation module 414 can further perform an image overlapping processing on the patternized data FD to use the patternized data FD as a foreground image to be overlapped with a background image in various types, so as increase the fun of using the electronic tickets. Implementation of the aforesaid step is optional and not particularly limited by the disclosure. Next, the encoding and modulation module 414 outputs the patternized data FD to the signal output and driving module 416. The signal output and driving module 416 drives the image display 420 to display the image frames according to the patternized data FD. Accordingly, the image display 420 displays the patternized data FD in the manner of dynamic twinkling. In the embodiment, an encoding operation includes, for example, patternizing the data and displaying the patternized data in the manner of dynamic twinkling.

Figure 4:
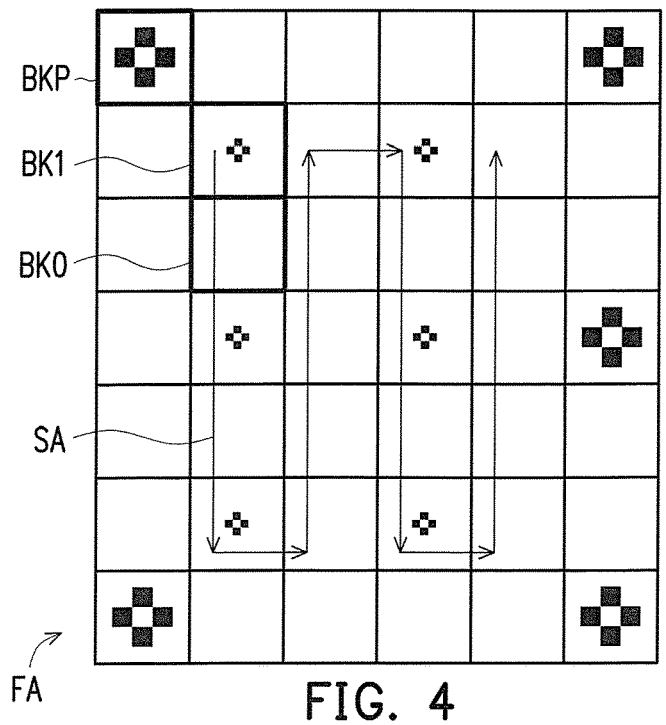
FIG. 4 and FIG. 5 are schematic diagrams respectively illustrating different image frames displayed by an image display according to an embodiment of the disclosure.
Figure 5:
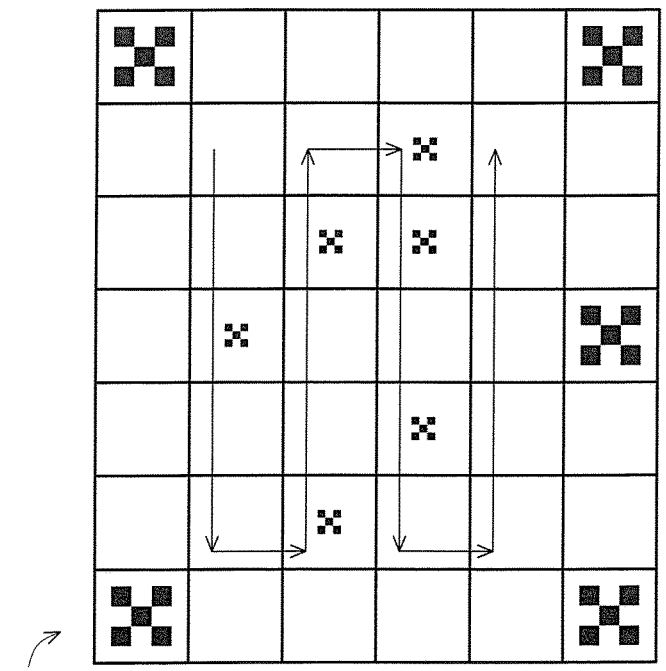
Figure 6:
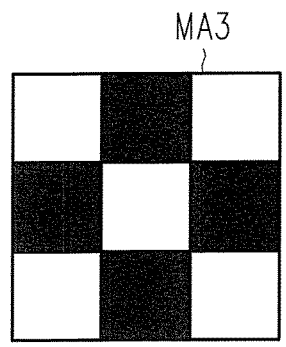
FIG. 6 and FIG. 7 are schematic diagrams respectively illustrating different identification patterns in the image frames in the embodiments of FIG. 4 and FIG. 5.
Figure 7:
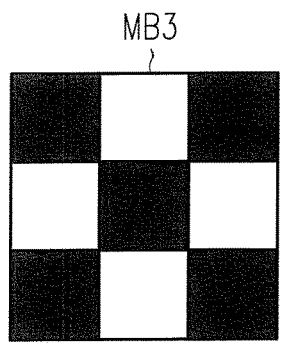

FIG. 4 and FIG. 5 are schematic diagrams respectively illustrating different image frames displayed by an image display according to an embodiment of the disclosure. FIG. 6 and FIG. 7 are schematic diagrams respectively illustrating different identification patterns in the image frames in the embodiments of FIG. 4 and FIG. 5. Referring to FIG. 4 to FIG. 7, in the embodiment, the signal output and driving module 416 drives the image display 420 to display a plurality of image frames (e.g., a first image frame FA and a second image frame FB) according to the patternized data FD.

Each of the image frames displayed by the image display 420 includes different identification patterns. For instance, the first image frame FA includes an identification pattern MA3 as depicted in FIG. 6, and the second image frame FB includes an identification pattern MB3 as depicted in FIG. 7. In the embodiment, the encoding and modulation module 414 patternizes the data DD1 into at least two different image frames, so as to improve the security of the data.

Taking the first image frame FA for example, the data DD1 includes, for example, one digital data 10101000001010100000. The encoding and modulating module 414 patternizes a first data code 0 in such digital data into ones not including the identification pattern MA3 (e.g., BK0) among blocks of the first image frame FA. The encoding and modulating module 414 patternizes a second data code 1 in such digital data into ones including the identification pattern MA3 (e.g., BK1) among the blocks of the first image frame FA. In an embodiment, the first data code 0 may also be patternized into the block including the identification pattern MA3 and the second data code 1 may also be patternized into the block not including the identification pattern MA3, which are not particularly limited by the disclosure. Therefore, according to an encoding sequence SA in the first image frame FA, the encoding and modulation module 414 patternizes such digital data 10101000001010100000 into the first image frame FA. In the embodiment, the digital data 10101000001010100000 includes 20 binary data codes. Accordingly, there are 20 patternized blocks for corresponding to the data codes in the first image frame FA, which are distributed in a concentrated and adjacent manner. However, the foregoing amount and distribution manner are not intended to limit the disclosure but may be adjusted according to the design. For example, in an embodiment, if the data codes included by the digital data are less, the patternized blocks may be distributed in the first image frame FA in a dispersed and non-adjacent manner. Further, in the embodiment, the encoding sequence SA of the digital data encodes from top to down and then left to right, but the disclosure is not limited thereto. In an embodiment, the encoding sequence SA may also encodes from left to right and then from top to down. In an embodiment, the encoding sequence SA may select the blocks corresponding to different positions among the 20 blocks arbitrarily or randomly for the encoding.

In the embodiment, the first image frame FA further includes a plurality of positioning patterns, which are located on blocks BKP at different positions and distributed surrounding the identification patterns MA3. However, the foregoing amount and distribution manner are not intended to limit the disclosure. In the embodiment, a type of the positioning pattern in the block BKP is identical to the identification pattern MA3 but in a different size, but the disclosure is not limited thereto. In an embodiment, the type of the positioning pattern of the first image frame FA may be different from the identification pattern MA3 or both of which can have the identical sizes, which may be adjusted according to the design.

In the embodiment, a method of patternizing another digital data 00100100101101000000 in the data DD1 into the second image frame FB by the encoding and modulation module 414 is similar to the method used for patternizing the first image frame FA, and a major difference between the two is, for example, types of the identification pattern MB3 and the positioning patterns. Sufficient teaching, suggestion, and description regarding an encoding method of patternizing such digital data into the second image frame FB by the encoding and modulation module 414 may be obtained from description in the embodiment of the first image frame FA in FIG. 1A, and thus related description thereof is not repeated hereinafter.

Figure 8:
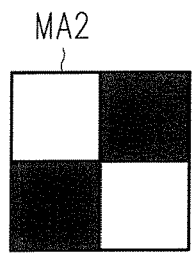
FIG. 8 and FIG. 9 are schematic diagrams respectively illustrating different identification patterns in the image frames according to another embodiment of the disclosure.
Figure 9:
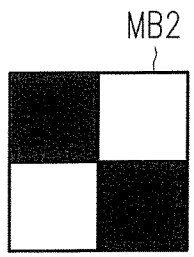

In the embodiments of FIG. 6 and FIG. 7, pattern dimensions of the identification patterns MA3 and MB3 are presented in a 3×3 pixel matrix, but the disclosure is not limited thereto. FIG. 8 and FIG. 9 are schematic diagrams respectively illustrating different identification patterns in the image frames according to another embodiment of the disclosure. Referring FIG. 8 and FIG. 9, pattern dimensions of identification patterns MA2 and MB2 of the embodiment are in a 2×2 pixel matrix, for example. Sufficient teaching, suggestion, and description regarding an encoding method of patternizing the digital data in the data DD1 into different image frames by the encoding and modulation module 414 utilizing the identification patterns MA2 and MB2 may be obtained from description in the embodiment of the first image frame FA and the second image frame FB, and thus related description thereof is not repeated hereinafter. Therefore, the pattern dimensions of the identification patterns in the exemplary embodiments of the disclosure may be adjusted based on the design, which are not particularly limited by the disclosure. The pattern dimensions in the same group of the identification patterns may also be different. For example, the identification pattern MA2 may be used together with the identification pattern MB3, or the identification pattern MA3 be used together with the identification pattern MB2, which are not particularly limited by the disclosure.

Figure 10:
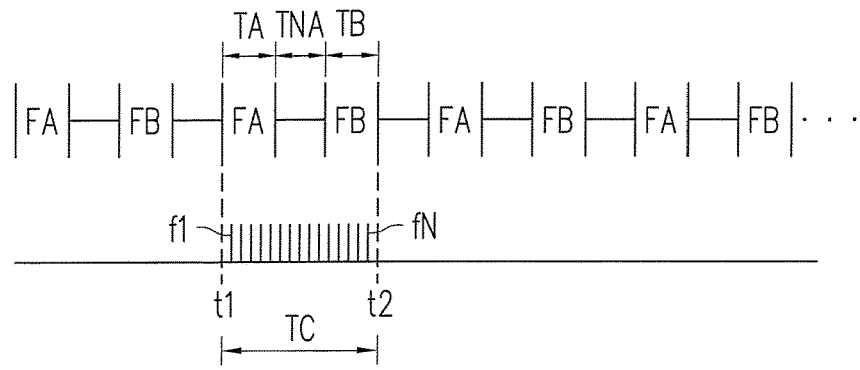
FIG. 10 is a schematic diagram illustrating different image frames periodically displayed by the image display and the image frames captured by the image capturing device in the predetermined time period according to an embodiment of the disclosure.

FIG. 10 is a schematic diagram illustrating different image frames periodically displayed by the image display and the image frames captured by the image capturing device in the predetermined time period according to an embodiment of the disclosure. Referring to FIG. 2 and FIG. 10, in the embodiment, the image display 420 periodically displays a plurality of different image frames by a predetermined sequence, such as a sequence in which the first image frame FA and the second image FB are alternately arranged. For instance, the image display 420 displays the first image frame FA in a manner of dynamic twinkling in a time period TA, and the image display 420 displays the second image frame FB in a manner of dynamic twinkling in a time period TB. In the embodiment, the first image frame FA and the second image frame FB twinkle, for example, in a predetermined frequency. In an embodiment, it is also possible that twinkling frequencies of the first image frame FA and the second image frame FB are different. Further, in the embodiment, in a time period TNA between the time period TA and the time period TB, the image display 420 does not display the first image frame FA nor the second image frame FB. In other words, the image display 420 does not display the image frames between the time periods in which the image frames are respectively displayed. In an embodiment, in the time period TNA in which the first image frame FA and the second image frame FB are not displayed by the image display 420, the image display 420, for example, displays any background image or a predetermined background image, or does not display any image frame at all.

In the embodiment, time lengths of the time period TA, the time period TB and the time period TNA are equal, but the disclosure is not limited thereto. In an embodiment, it is also possible that the time lengths of the time period TA and the time period TB are equal but greater or less than the time length of the time period TNA. In an embodiment, it is also possible that the time lengths of the time period TA and the time period TB are not equal. In an embodiment, it is also possible that the time lengths of the different time periods TNA are equal or not equal to one another, which are not particularly limited by the disclosure.

In the embodiment, the description is provided by using the image display 420 which alternately displays the two different image frames as an example, but the disclosure is not limited thereto. In an embodiment, the image display 420 may also display three or more different image frames, where the different image frames includes different identification patterns, respectively. The image display 420 periodically displays the three or more different image frames in a predetermined sequence, for example, or the image display 420 may also randomly display the different image frames in any sequence, which is not particularly limited by the disclosure.

In an embodiment, the data transmission apparatus 400 may further include functional elements including, for example, operation modules, storage modules, communication modules, power modules and so on, which are not particularly limited by the disclosure. In an embodiment, the image display 420 includes flat panel displays, curved panel displays or 3D displays, including Liquid Crystal Display (LCD), Plasma Display Panel (PDP), Organic Light Emitting Display (OLED), Field Emission Display (FED), Electro-Phoretic Display (EPD) or Light Emitting Diode Display and the like, which are not limited by the disclosure.

In an embodiment, the encoding and modulation module 414 and the signal output and driving module 416 includes, for example, Central Processing Unit (CPU), Microprocessor, Digital Signal Processor (DSP), Programmable Controller, Programmable Logic Device (PLD), or other similar devices, or a combination of the said devices, which are not particularly limited by the disclosure. Further, in an embodiment, each of the modules in the encoding block 410 in FIG. 2 may be implemented as a plurality of program codes. These program codes will be stored in one memory, so that these program codes may be executed by the encoding and modulation module 414 or the signal output and driving module 416. Alternatively, in an embodiment, each of the modules in the encoding block 410 in FIG. 2 may be implemented as one or more circuits. The disclosure is not intended to limit whether each of the modules in the encoding block 410 is implemented by ways of software or hardware.

In the embodiment, the image display 420 periodically displays the different image frames in the predetermined sequence to transmit the data FD that is encoded and encrypted into the image frames which dynamically twinkles to the data reading apparatus 500. Next, the data reading apparatus 500 captures the data FD which is patternized and dynamically twinkles in a predetermined time period TC, and performs a data processing operation on the captured data FD to identify the captured data FD, so as to generate and output a data DD2 which is identified. In the embodiment, a decoding operation includes, for example, capturing the data which dynamically twinkles in the predetermined time period, and performing a data processing operation to identify the data.

Referring to FIG. 3 and FIG. 10, the data reading apparatus 500 of the embodiment includes the decoding apparatus 530. The decoding apparatus 530 includes an image capturing device 510 and a decoding block 520. The decoding block 520 includes an image source module 522, an image processing module 524 and a data extracting module 526. In the embodiment, the image capturing device 510 captures the first image frame FA and the second image frame FB in the predetermined time period TC. In the embodiment, a time length of the time period TC is greater than each of the time lengths of the time periods TA and TB in which the first image frame FA and the second image frame FB are respectively displayed, but the disclosure is not limited thereto. The time length of the time period TC may be adjusted according to the design. In an embodiment, the time length of the time period TC may also be equal to the time length of the time period TA (or TB) in which the first image frame FA (or the second image frame FB) is displayed. For example, the time length of the time period TC is equal to the time length of the time period TA or TB.

In the embodiment, the image capturing device 510 starts capturing the image frames from a starting time point t1 of the time period TC. With elapse of time, the image capturing device 510 continuously captures the image frames. When an ending time point t2 of the time period TC is reached, the image capturing device 510 stops capturing the image frames. In the time period TC, the image capturing device 510 captures, for example, an N number of image frames, in which a $1^{st}$ image frame f1 is the first image frame FA, and an $N^{th}$ image frame fN is the second image frame FB, where N is a positive integer greater than or equal to 2. Next, the image capturing device 510 transmits the captured N number of image frames to the decoding block 520.

In the embodiment, the image capturing device 510 can start capturing the image frames at any time point. That is to say, the starting time point t1 does not necessarily fall within the time period TA. The time length of the time period TC may be adjusted according to the design. The image capturing device 510 can stop capturing the image frames at any time point. That is to say, the ending time point t2 does not necessarily fall within the time period TB. What illustrated in FIG. 10 is an exemplary example, and the disclosure is not limited thereto.

In the embodiment, the image source module 522 of the decoding block 520 is configured to receive the image frames transmitted from the image capturing device 510. The image source module 522 is used as a data transmission interface, which receives and temporarily stores the image frames in order to output the received N number of image frames to the image processing module 524. Next, the image processing module 524 performs the data processing operation on the image frames to identify encrypted messages included in the data FD. In the embodiment, the data processing operation includes, for example, a convolution operation, a binarization operation, a summation operation and a clustering algorithm. The image processing module 524 performs the convolution operation, the binarization operation, the summation operation and the clustering algorithm on the captured data in the image frames.

Specific implementation regarding how the image processing module 524 of the embodiment performs the convolution operation, the binarization operation, the summation operation and the clustering algorithm on the data in the image frames is described as follows.

Figure 11:
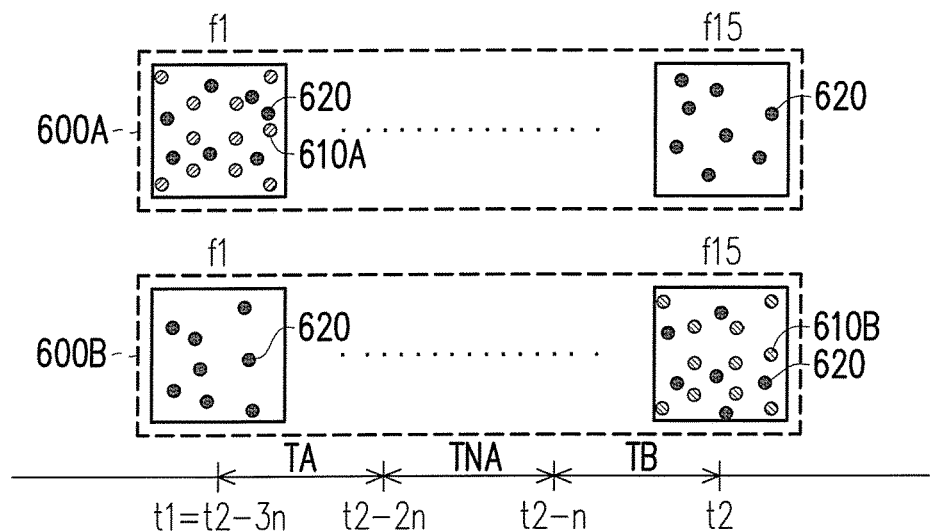
FIG. 11 is a schematic diagram illustrating a result of the convolution operation performed on the data in the image frames by the image processing module according to an embodiment of the disclosure.
Figure 12:
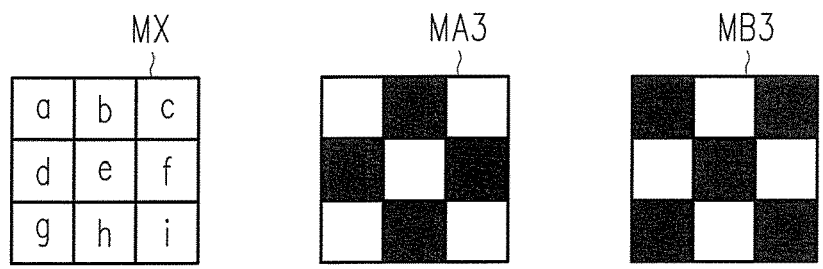
FIG. 12 is a schematic diagram illustrating a method of performing the binarization operation on the data in the image frames according to an embodiment of the disclosure.
Figure 13:
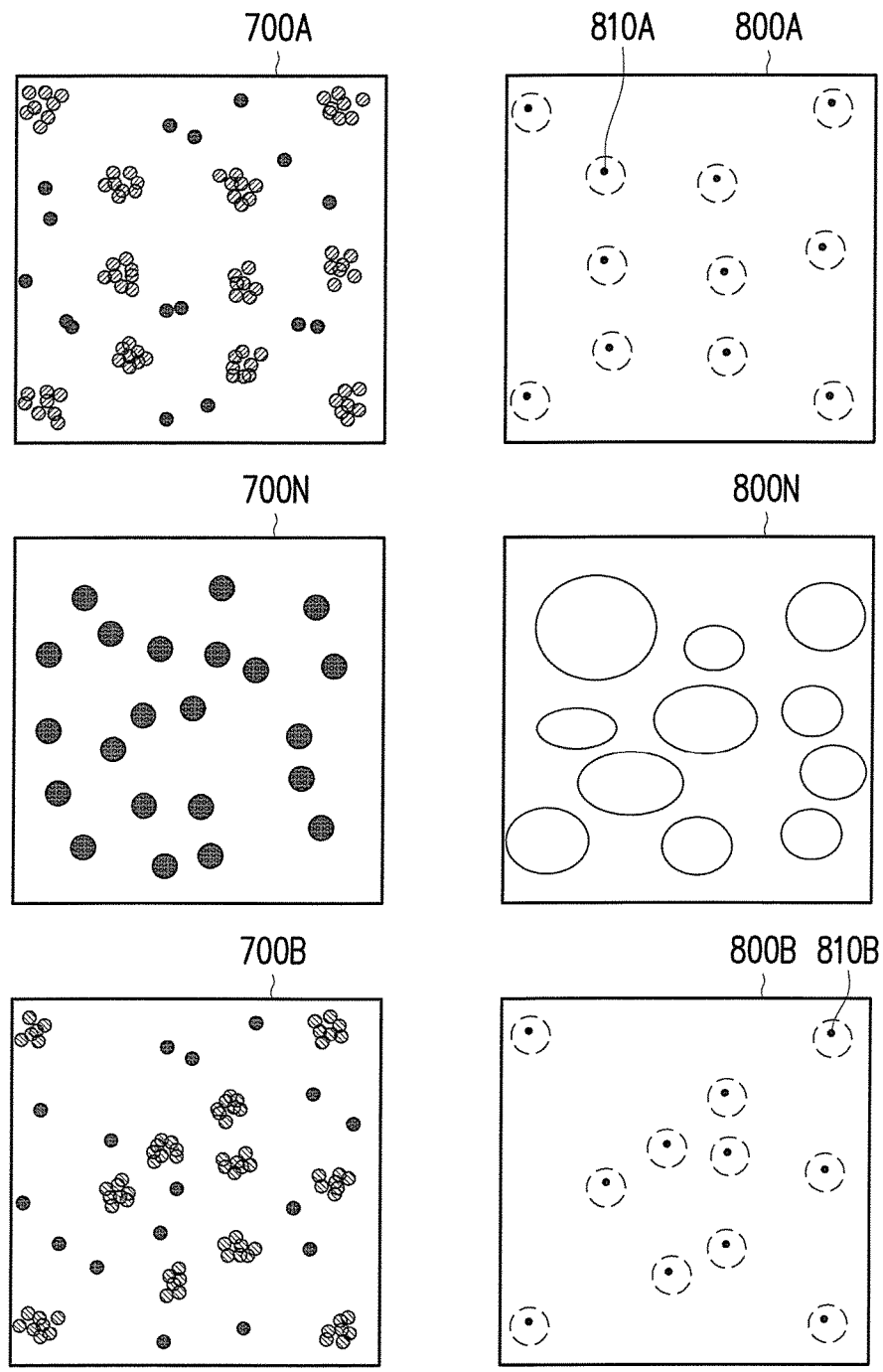
FIG. 13 is a schematic diagram illustrating the summation operation and the clustering algorithm performed on the data in the image frames by the image processing module according to an embodiment of the disclosure.

FIG. 11 is a schematic diagram illustrating a result of the convolution operation and the binarization operation performed on the data in the image frames by the image processing module according to an embodiment of the disclosure. FIG. 12 is a schematic diagram illustrating a method of performing the binarization operation on the data in the image frames according to an embodiment of the disclosure. Referring to FIG. 3, FIG. 12 and FIG. 13, in the embodiment, it is assumed that all of the time periods TA, TNA and TB are of n seconds, and the image capturing device 510 captures a total of 15 image frames in the time period TC (i.e., N=15). In the embodiment, the image processing module 524 performs the convolution operation and the binarization operation on each of the image frames captured by the image capturing device 510 in the time period TC by respectively utilizing the identification patterns MA3 and MB3, so as to obtain two convolution operation and binarization results 600A and 600B, respectively.

Taking the (first) convolution operation and binarization result 600A for example, the image display 420 displays the first image frame FA in the manner of dynamic twinkling in the time period TA. Accordingly, in a period starting from a time point t2-3n to a time point t2-2n, taking the $1^{st}$ image frame f1 for example, the image processing module 524 performs the convolution operation on the $1^{st}$ image frame f1 by utilizing the identification pattern MA3, and a result thereof indicates that one marked by 610A is a data point that is possibly corresponding to the identification patterns MA3 in the image frame f1 and one marked by 620 is a noise point in the image frame f1. In a period starting from a time point t2-n to a time point t2, taking the $15^{th}$ image frame f15 for example, the image processing module 524 performs the convolution operation on the $15^{th}$ image frame f15 by utilizing the identification pattern MA3, and a result thereof indicates that the data point corresponding to the identification pattern MA3 is not included in the image frame f15 and one marked by 620 is the noise point in the image frame f15.

Next, taking the (second) convolution operation and binarization result 600B for example, the image display 420 displays the second image frame FB in the manner of dynamic twinkling in the time period TB. Accordingly, in the period starting from the time point t2-3n to the time point t2-2n, taking the $1^{st}$ image frame f1 for example, the image processing module 524 performs the convolution operation on the $1^{st}$ image frame f1 by utilizing the identification pattern MB3, and a result thereof indicates that the data point corresponding to the identification pattern MB3 is not included in the image frame f1 and one marked by 620 is the noise point in the image frame f1. In the period starting from the time point t2-n to the time point t2, taking the $15^{st}$ image frame f15 for example, the image processing module 524 performs the convolution operation on the $15^{st}$ image frame f1 by utilizing the identification pattern MB3, and a result thereof indicates that one marked by 610B is a data point that is possibly corresponding to the identification patterns MB3 in the image frame f15 and one marked by 620 is the noise point in the image frame f15.

In the embodiment, the convolution operation may be implemented by using steps in any convolution operations in the related art, which are not particularly limited by the disclosure. Enough teaching, suggestion, and implementation illustration for aforesaid steps and embodiments thereof may be obtained with reference to common knowledge in the related art, which is not repeated hereinafter.

Referring to FIG. 12, in FIG. 12, the image processing module 524 divides each of the identification patterns MA3 and MB3 into 9 positions by utilizing a coordinate matrix MX. Taking the identification pattern MA3 for example, the image processing module 524 calculates a first pixel average value of the identification pattern MA3 at 5 positions a, c, e, g and i, and a second pixel average value of the identification pattern MA3 at 4 positions b, d, f and h. The image processing module 524 then calculates a difference between the first pixel average value and the second pixel average value. If the difference between the two is greater than a predetermined threshold, the image processing module 524 determines that the blocks include the identification pattern MA3 and binarizes the blocks into the second data code 1. Conversely, if the difference between the two is less than or equal to the predetermined threshold, the image processing module 524 determines that the blocks do not include the identification pattern MA3 and binarizes the blocks into the first data code 0.

Taking the identification pattern MB3 for example, the image processing module 524 calculates a third pixel average value of the identification pattern MB3 at 4 positions b, d, f and h, and a fourth pixel average value of the identification pattern MB3 at 5 positions a, c, e, g and i. The image processing module 524 then calculates a difference between the third pixel average value and the fourth pixel average value. If the difference between the two is greater than a predetermined threshold, the image processing module 524 determines that the blocks include the identification pattern MB3 and binarizes the blocks into the second data code 1. Conversely, if the difference between the two is less than or equal to the predetermined threshold, the image processing module 524 determines that the blocks do not include the identification pattern MB3 and binarizes the blocks into the first data code 0. In the embodiment, the pixel value refers to, for example, a gray level value of the pixel, but the disclosure is not limited thereto.

FIG. 13 is a schematic diagram illustrating the summation operation and the clustering algorithm performed on the data in the image frames by the image processing module according to an embodiment of the disclosure. Referring to FIG. 3 and FIG. 13, in the embodiment, the image processing module 524 performs the summation operation on the $1^{st}$ image frame f1 to the $5^{th}$ image frame in the convolution operation and binarization result 600A in the period starting from the time point t2-3n to the time point t2-2n, so as to obtain a summation operation result 700A. Next, the image processing module 524 performs the summation operation on the $6^{th}$ image frame to the $10^{th}$ image frame in the convolution operation and binarization result 600A or the convolution operation and binarization result 600B in the period starting from the time point t2-2n to the time point t2-n, so as to obtain a summation operation result 700N. Next, the image processing module 524 performs the summation operation on the $11^{th}$ image frame to the $15^{th}$ image frame f15 in the convolution operation and binarization result 600B in the period starting from the time point t2-n to the time point t2, so as to obtain a summation operation result 700B.

In the embodiment, after obtaining the summation operation results, the image processing module 524 performs the clustering algorithm on each of the summation operation results. For instance, the image processing module 524 performs the clustering algorithm on the summation operation result 700A. When the data points in the summation operation result 700A sufficiently satisfy a grouping relation (e.g., a standard deviation is less than a predetermined threshold), the image processing module 524 can obtain a clustering algorithm result 800A. According to the clustering algorithm result 800A, the blocks including the identification pattern MA3 (which is corresponding to the second data code 1) may be resolved by the image processing module 524 according to coordinate data of a cluster center point 810A. Similarly, according to the clustering algorithm result 800B, the blocks including the identification pattern MB3 (which is corresponding to the second data code 1) may be resolved by the image processing module 524 according to coordinate data of a cluster center point 810B. In the embodiment, the data points in a summation operation result 700N do not satisfy the grouping relation, which indicates that the summation operation result 700N does not include the data points. Accordingly, a clustering algorithm result 800N does not include the cluster center point, so that the blocks including the identification pattern MA3 or the identification pattern MB3 cannot be resolved by the image processing module 524.

In the embodiment, the clustering algorithm may be implemented by using steps in any clustering algorithms in the related art, which are not particularly limited by the disclosure. Enough teaching, suggestion, and implementation illustration for aforesaid steps and embodiments thereof may be obtained with reference to common knowledge in the related art, which is not repeated hereinafter.

Accordingly, in the embodiment, the image processing module 524 outputs an identification result to the data extracting module 526. The extracting module 526 receives and temporarily stores the identification result. The extracting module 526 converts the identified data into the data DD2 in digital form and outputs the data DD2 in digital form. The data DD2 in digital form is corresponding to the data DD1 before being encrypted and encoded.

In an embodiment, the data reading apparatus 500 may further include functional elements including, for example, operation modules, storage modules, communication modules, power modules and so on, which are not particularly limited by the disclosure. In an embodiment, the image capturing device 510 includes, for example, a charge coupled device image sensor (CCD image sensor) or a complementary metal oxide semiconductor (CMOS) image sensor or the like, which are not particularly limited by the disclosure.

In an embodiment, the image processing module 524 includes, for example, Central Processing Unit (CPU), Microprocessor, Digital Signal Processor (DSP), Programmable Controller, Programmable Logic Device (PLD), or other similar devices, a combination of the said devices, which are not particularly limited by the disclosure. Further, in an embodiment, each of the modules in the decoding block 520 in FIG. 3 may also be implemented as a plurality of program codes. These program codes will be stored in one memory, so that these program codes may be executed by the image processing module 524 later. Alternatively, in an embodiment, each of the modules in the decoding block 520 in FIG. 3 may be implemented as one or more circuits. The disclosure is not intended to limit whether each of the modules in the decoding block 520 is implemented by ways of software or hardware.

Figure 14:
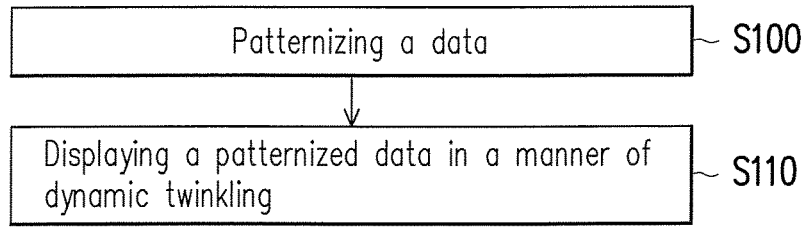
FIG. 14 is a flowchart illustrating steps in a data transmission method according to an embodiment of the disclosure.

FIG. 14 is a flowchart illustrating steps in a data transmission method according to an embodiment of the disclosure. Referring to FIG. 2 and FIG. 14, the data transmission method of the embodiment is at least adapted to the data transmission apparatus 400 of FIG. 2, but the disclosure is not limited thereto. Taking the data transmission apparatus 400 of FIG. 2 for example, in step S100, the data transmission apparatus 400 patternizes the received data DD1. In step S110, the data transmission apparatus 400 displays the patternized data FD in the manner of dynamic twinkling to transmit the patternized data FD. In addition, sufficient teaching, suggestion, and implementation illustration regarding the data transmission method of the embodiments of the disclosure may be obtained from the foregoing embodiments of FIG. 2, FIG. 4 to FIG. 9, and thus related description thereof is not repeated hereinafter.

Figure 15:
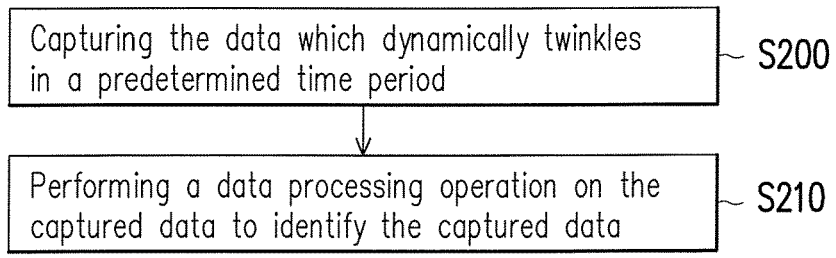
FIG. 15 is a flowchart illustrating steps in a data reading method according to an embodiment of the disclosure.

FIG. 15 is a flowchart illustrating steps in a data reading method according to an embodiment of the disclosure. Referring to FIG. 3 and FIG. 15, the data reading method of the embodiment is at least adapted to the data reading apparatus 500 of FIG. 3, but the disclosure is not limited thereto. Taking the data reading apparatus 500 of FIG. 3 for example, in step S200, the data reading apparatus 500 captures the data FD which is patternized and dynamically twinkles in the predetermined time period TC. In step S210, the data reading apparatus 500 performs the data processing operation on the captured data FD to identify the captured data FD, and generates and outputs the identified data DD2. In addition, sufficient teaching, suggestion, and implementation illustration regarding the data reading method of the embodiments of the disclosure may be obtained from the foregoing embodiments of FIG. 3, FIG. 10 to FIG. 13, and thus related description thereof is not repeated hereinafter.

Figure 16:
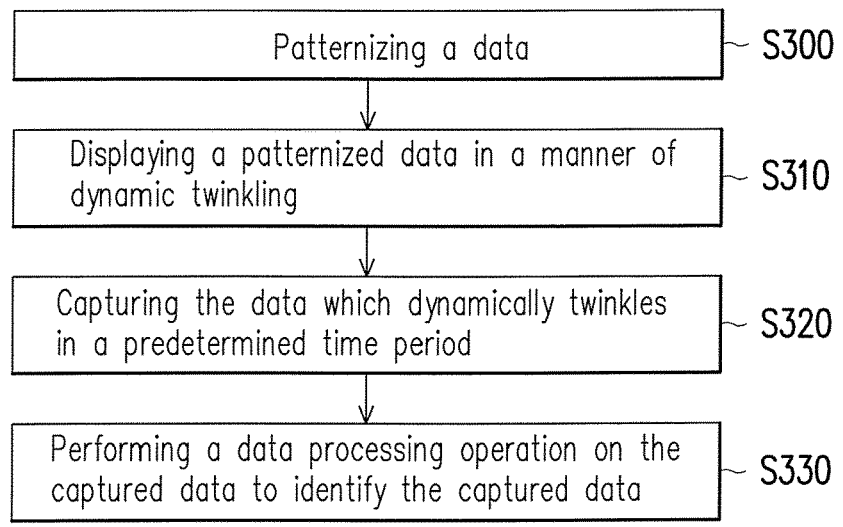
FIG. 16 is a flowchart illustrating steps in a data encoding and decoding method according to an embodiment of the disclosure.

FIG. 16 is a flowchart illustrating steps in a data encoding and decoding method according to an embodiment of the disclosure. Referring to FIG. 2, FIG. 3 and FIG. 16, the data encoding and decoding method of the embodiment is at least adapted to the data transmission apparatus 400 of FIG. 2 and the data reading apparatus 500 of FIG. 3, but the disclosure is not limited thereto. Taking the data transmission apparatus 400 of FIG. 2 and the data reading apparatus 500 of FIG. 3 for example, in step S300, the data transmission apparatus 400 patternizes the received data DD1. In step S310, the data transmission apparatus 400 displays the patternized data FD in the manner of dynamic twinkling to transmit the patternized data FD. In step S320, the data reading apparatus 500 captures the data FD which is patternized and dynamically twinkles in the predetermined time period TC. In step S330, the data reading apparatus 500 performs the data processing operation on the captured data FD to identify the captured data FD, and generates and outputs the identified data DD2. In addition, sufficient teaching, suggestion, and implementation illustration regarding the encoding and decoding method of the embodiments of the disclosure may be obtained from the foregoing embodiments of FIG. 2 to FIG. 13, and thus related description thereof is not repeated hereinafter.

In summary, in the exemplary embodiments of the disclosure, the data encoding method allows the data transmission apparatus to patternize and hide the data in the image frame which dynamically twinkles. The data transmission apparatus embeds the foreground image in the specific twinkling frequency into the background image by patternizing the content of data differently. The data reading apparatus decodes and identifies the data hidden in the image frame which dynamically twinkles through different decoding parameters by using the image processing in the decoding method. After capturing the image frames by the image capturing device, the data reading apparatus performs the image processing analysis to interpret the data content through the pattern detection, the denoising and the decoding process of the encoded patterns. In addition, the data transmission apparatus can embed multiple-information by variations in time, space and patterns, so that the data reading apparatus can read the corresponding data by using different decoding parameters. Accordingly, the data transmission and reading methods provided by the exemplary embodiments of the disclosure are capable of improving the security in data transmission while improving the correctness and convenience in data reading.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A data transmission apparatus, comprising:
an encoding apparatus, configured to patternize a data and display the patternized data in a manner of dynamic twinkling to transmit the patternized data, wherein the patternized data twinkles in a predetermined frequency,
wherein the patternized data comprises a plurality of image frames, each of the plurality of image frames comprises a plurality of blocks having an identical size, and a part of the plurality of blocks comprises a plurality of identification patterns and a plurality of positioning patterns,
wherein the plurality of identification patterns and the plurality of positioning patterns have an identical pattern in each of the plurality of image frames, and a pattern shape of each of the plurality of identification patterns of one of the plurality of image frames is different from a pattern shape of each of the plurality of identification patterns of another one of the plurality of image frames,
wherein a pattern dimension of each of the plurality of identification patterns and of each of the plurality of positioning patterns is a multi-order pixel matrix.

2. The data transmission apparatus of claim 1, wherein in the image frames, the positioning patterns are distributed surrounding the identification patterns.

3. The data transmission apparatus of claim 1, a first data code is patternized into blocks not including the identification pattern among the blocks and a second data code is patternized into blocks including the identification pattern among the blocks.

4. The data transmission apparatus of claim 1, wherein the encoding apparatus periodically displays the image frames in a predetermined sequence to transmit the image frames to a data reading apparatus.

5. The data transmission apparatus of claim 4, wherein time lengths of time periods in which the image frames are respectively displayed are identical.

6. The data transmission apparatus of claim 4, wherein the encoding apparatus does not display the image frames between time periods in which the image frames are respectively displayed.

7. The data transmission apparatus of claim 6, wherein each of time lengths of time periods in which the image frames are not displayed by the encoding apparatus is identical to each of the time lengths of the time periods in which the image frames are respectively displayed.

8. The data transmission apparatus of claim 4, wherein a time length of a predetermined time period for capturing the data which dynamically twinkles by a decoding apparatus is greater than or equal to each of time lengths of time periods in which the image frames are respectively displayed.

9. The data transmission apparatus of claim 1, wherein the encoding apparatus displays the patternized data as a foreground image frame, and the encoding apparatus further displays a background image frame, wherein the foreground image frame is displayed together and overlapped with the background image frame.

10. A data transmission method, comprising:
   patternizing a data; and
   displaying the patternized data in a manner of dynamic twinkling to transmit the patternized data, wherein the patternized data twinkles in a predetermined frequency,
   wherein the patternized data comprises a plurality of image frames, and in the step of patternizing the data, the data is patternized so that each of the plurality of image frames comprises a plurality of blocks having an identical size, and a part of the plurality of blocks comprises a plurality of identification patterns and a plurality of positioning patterns,
   wherein the plurality of identification patterns and the plurality of positioning patterns have an identical pattern in each of the plurality of image frames, and a pattern shape of each of the plurality of identification patterns of one of the plurality of image frames is different from a pattern shape of each of the plurality of identification patterns of another one of the plurality of image frames,
   wherein a pattern dimension of each of the plurality of identification patterns and of each of the plurality of positioning patterns is a multi-order pixel matrix.

11. The data transmission method of claim 10, wherein in the image frames, the positioning patterns are distributed surrounding the identification patterns.

12. The data transmission method of claim 10, wherein a first data code is patternized into blocks not including the identification pattern among the blocks and a second data code is patternized into blocks including the identification patterns among the blocks.

13. The data transmission method of claim 10, wherein in the step of displaying the patternized data in the manner of dynamic twinkling, the image frames are periodically displayed in a predetermined sequence to transmit the image frames.

14. The data transmission method of claim 13, wherein time lengths of time periods in which the image frames are respectively displayed are identical.

15. The data transmission method of claim 13, further comprising: not displaying the image frames between time periods in which the image frames are respectively displayed.

16. The data transmission method of claim 15, wherein each of time lengths of time periods in which the image frames are not displayed is identical to each of the time lengths of the time periods in which the image frames are respectively displayed.

17. The data transmission method of claim 13, wherein a time length of a predetermined time period for capturing the data which dynamically twinkles is greater than or equal to each of time lengths of time periods in which the image frames are respectively displayed.

18. The data transmission method of claim 10, wherein in the step of displaying the patternized data in the manner of dynamic twinkling, the patternized data is displayed as a foreground image frame, and the data transmission method further comprises a background image frame, wherein the foreground image frame is displayed together and overlapped with the background image frame.

19. A data reading apparatus, comprising:
   a decoding apparatus, configured to capture a data in a predetermined time period is patternized and dynamically twinkles and configured to perform a data processing operation on the captured data to identify the captured data, wherein the patternized data twinkles in a predetermined frequency,
   wherein the patternized data comprises a plurality of image frames, each of the plurality of image frames comprises a plurality of blocks having an identical size, and a part of the plurality of blocks comprises a plurality of identification patterns and a plurality of positioning patterns,
   wherein the plurality of identification patterns and the plurality of positioning patterns have an identical pattern in each of the plurality of image frames, and a pattern shape of each of the plurality of identification patterns of one of the plurality of image frames is different from a pattern shape of each of the plurality of identification patterns of another one of the plurality of image frames,
   wherein a pattern dimension of each of the plurality of identification patterns and of each of the plurality of positioning patterns is a multi-order pixel matrix.

20. The data reading apparatus of claim 19, wherein the data processing operation comprises a convolution operation, a binarization operation, a summation operation and a clustering algorithm, and the decoding apparatus performs the convolution operation, the binarization operation, the summation operation and the clustering algorithm on the captured data to identify the data.

21. The data reading apparatus of claim 19, wherein the decoding apparatus converts the identified data into the data in digital form.

22. The data reading apparatus of claim 19, wherein in the image frames, the positioning patterns are distributed surrounding the identification patterns.

23. The data reading apparatus of claim 19, wherein a first data code is patternized into blocks not including the identification pattern among the blocks and a second data code is patternized into blocks including the identification pattern among the blocks.

24. A data reading method, comprising:
   capturing a data in a predetermined time period, wherein the data is patternized and dynamically twinkles; and
   performing a data processing operation on the captured data to identify the captured data, wherein the patternized data twinkles in a predetermined frequency,
   wherein the patternized data comprises a plurality of image frames, each of the plurality of image frames comprises a plurality of blocks having an identical size, and a part of the plurality of blocks comprises a plurality of identification patterns and a plurality of positioning patterns,
   wherein the plurality of identification patterns and the plurality of positioning patterns have an identical pattern in each of the plurality of image frames, and a pattern shape of each of the plurality of identification patterns of one of the plurality of image frames is different from a pattern shape of each of the plurality of identification patterns of another one of the plurality of image frames,
   wherein a pattern dimension of each of the plurality of identification patterns and of each of the plurality of positioning patterns is a multi-order pixel matrix.

25. The data reading method of claim 24, wherein in the step of performing the data processing operation on the captured data to identify the captured data comprising:

performing a convolution operation, a binarization operation, a summation operation and a clustering algorithm on the captured data to identify the data.

26. The data reading method of claim 24, further comprising: converting the identified data into the data in digital form.

27. A data encoding and decoding system, comprising:
an encoding apparatus, configured to patternize a data and display the patternized data in a manner of dynamic twinkling, wherein the patternized data twinkles in a predetermined frequency; and
a decoding apparatus coupled to the encoding apparatus, and configured to capture the patternized data in a predetermined time period, wherein the patternized data dynamically twinkles, and the decoding apparatus performs a data processing operation on the captured data to identify the captured data,
wherein the patternized data comprises a plurality of image frames, each of the plurality of image frames comprises a plurality of blocks having an identical size, and a part of the plurality of blocks comprises a plurality of identification patterns and a plurality of positioning patterns,
wherein the plurality of identification patterns and the plurality of positioning patterns have an identical pattern in each of the plurality of image frames, and a pattern shape of each of the plurality of identification patterns of one of the plurality of image frames is different from a pattern shape of each of the plurality of identification patterns of another one of the plurality of image frames,
wherein a pattern dimension of each of the plurality of identification patterns and of each of the plurality of positioning patterns is a multi-order pixel matrix.

28. The data encoding and decoding system of claim 27, wherein in the image frames, the positioning patterns are distributed surrounding the identification patterns.

29. The data encoding and decoding system of claim 27, wherein a first data code is patternized into blocks not including the identification patterns among the blocks and a second data code is patternized into blocks including the identification patterns among the blocks.

30. The data encoding and decoding system of claim 27, wherein the encoding apparatus periodically displays the image frames in a predetermined sequence to transmit the image frames to the decoding apparatus.

31. The data encoding and decoding system of claim 30, wherein time lengths of time periods in which the image frames are respectively displayed are identical.

32. The data encoding and decoding system of claim 30, wherein the encoding apparatus does not display the image frames between time periods in which the image frames are respectively displayed.

33. The data encoding and decoding system of claim 32, wherein each of time lengths of time periods in which the image frames are not displayed by the encoding apparatus is identical to each of the time lengths of the time periods in which the image frames are respectively displayed.

34. The data encoding and decoding system of claim 30, wherein a time length of a predetermined time period for capturing the data which dynamically twinkles by a decoding apparatus is greater than or equal to each of time lengths of time periods in which the image frames are respectively displayed.

35. The data encoding and decoding system of claim 27, wherein the encoding apparatus displays the patternized data as a foreground image frame, and the encoding apparatus further displays a background image frame, wherein the foreground image frame is displayed together and overlapped with the background image frame.

36. The data encoding and decoding system of claim 27, wherein the data processing operation comprises a convolution operation, a binarization operation, a summation operation and a clustering algorithm, and the decoding apparatus performs the convolution operation, the binarization operation, the summation operation and the clustering algorithm on the captured data to identify the data.

37. The data encoding and decoding system of claim 27, wherein the encoding apparatus patternizes the data in digital form, and the decoding apparatus converts the identified data into the data in digital form.

38. A data encoding and decoding method, comprising:
patternizing a data;
displaying the patternized data in a manner of dynamic twinkling;
capturing the patternized data in a predetermined time period; and
performing a data processing operation on the captured data to identify the captured data,
wherein the patternized data twinkles in a predetermined frequency,
wherein the patternized data comprises a plurality of image frames, and in the step of patternizing the data, the data is patternized so that each of the plurality of image frames comprises a plurality of blocks having an identical size, and a part of the plurality of blocks comprises a plurality of identification patterns and a plurality of positioning patterns,
wherein the plurality of identification patterns and the plurality of positioning patterns have an identical pattern in each of the plurality of image frames, and a pattern shape of each of the plurality of identification patterns of one of the plurality of image frames is different from a pattern shape of each of the plurality of identification patterns of another one of the plurality of image frames,
wherein a pattern dimension of each of the plurality of identification patterns and of each of the plurality of positioning patterns is a multi-order pixel matrix.

39. The data encoding and decoding method of claim 38, wherein in the image frames, the positioning patterns are distributed surrounding the identification patterns.

40. The data encoding and decoding method of claim 38, wherein in the step of patternizing the data, a first data code is patternized into blocks not including the identification pattern among the blocks and a second data code is patternized into blocks including the identification patterns among the blocks.

41. The data encoding and decoding method of claim 38, wherein in the step of displaying the patternized data in the manner of dynamic twinkling, the image frames are periodically displayed in a predetermined sequence to transmit the image frames.

42. The data encoding and decoding method of claim 41, wherein time lengths of time periods in which the image frames are respectively displayed are identical.

43. The data encoding and decoding method of claim 41, further comprising: not displaying the image frames between time periods in which the image frames are respectively displayed.

44. The data encoding and decoding method of claim 43, wherein each of time lengths of time periods in which the image frames are not displayed is identical to each of the time lengths of the time periods in which the image frames are respectively displayed.

45. The data encoding and decoding method of claim 41, wherein a time length of the predetermined time period for capturing the data which dynamically twinkles is greater than or equal to each of time lengths of time periods in which the image frames are respectively displayed.

46. The data encoding and decoding method of claim 38, wherein in the step of displaying the patternized data in the manner of dynamic twinkling, the patternized data is displayed as a foreground image frame, and the data encoding and decoding method further comprises a background image frame, wherein the foreground image frame is displayed together and overlapped with the background image frame.

47. The data encoding and decoding method of claim 38, wherein in the step of performing the data processing operation on the captured data to identify the captured data comprising:
   performing a convolution operation, a binarization operation, a summation operation and a clustering algorithm on the captured data to identify the data.

48. The data encoding and decoding method of claim 38, wherein in the step of patternizing the data, the data in digital form is patternized, and the data encoding and decoding method further comprises converting the identified data into the data in digital form.

* * * * *